United States Patent [19]

DiCarlantonio et al.

[11] 4,163,817

[45] Aug. 7, 1979

[54] DECORATIVE PATCH

[76] Inventors: Norman L. DiCarlantonio, 8224 Raymond La., Potomac, Md. 20854; Jerome F. Thiel, 2412 Nottingham Dr., Falls Church, Va. 22043

[21] Appl. No.: 859,197

[22] Filed: Dec. 9, 1977

[51] Int. Cl.$^{2}$ ........................... F16B 5/07; F16B 2/06; B32B 3/10; F16B 17/00

[52] U.S. Cl. ........................................ 428/33; 428/63; 428/131; 428/26; 85/5 R; 85/DIG. 2; 24/208 A

[58] Field of Search .................................... 428/23-26, 428/33-63; 63/29 R; 132/40; 85/DIG. 2, 5 R; 24/208 A, 106

[56] References Cited

U.S. PATENT DOCUMENTS

| | | | |
|---|---|---|---|
| 2,150,080 | 3/1939 | Rawlings | 85/DIG. 2 |
| 2,297,313 | 9/1942 | Molla | 428/24 X |
| 3,088,295 | 5/1963 | Haines | 428/24 X |
| 3,261,393 | 7/1966 | Templeton | 428/63 X |
| 3,412,437 | 11/1968 | Bennett | 85/5 R |
| 3,605,438 | 9/1971 | Chalson | 428/28 X |

FOREIGN PATENT DOCUMENTS

| | | | |
|---|---|---|---|
| 520169 | of 1940 | United Kingdom | 85/DIG. 2 |

*Primary Examiner*—George F. Lesmes
*Assistant Examiner*—Alexander S. Thomas
*Attorney, Agent, or Firm*—Michael W. York

[57] ABSTRACT

A decorative patch for repairing screens and other thin materials. The decorative patch includes two interlocking portions that are also separable. Each of these portions has a flat surface on one side that is adapted to rest upon the surface of the material that is being repaired. The opposite side of each of these portions has a three-dimensional decorative surface. Each of the separable portions has spaced protrusions extending from the flat surface that are adapted to be insertable into apertures located in the flat surface of the other portion. Both of these portions are made from a plastic or similar material that is capable of transmitting at least a portion of light through it. These two portions are adapted to be located on the respective sides of the screen or the like that is to be repaired. The decorative patch provides an easy and economical way in which to either permanently or temporarily repair a screen or some other similar material.

6 Claims, 14 Drawing Figures

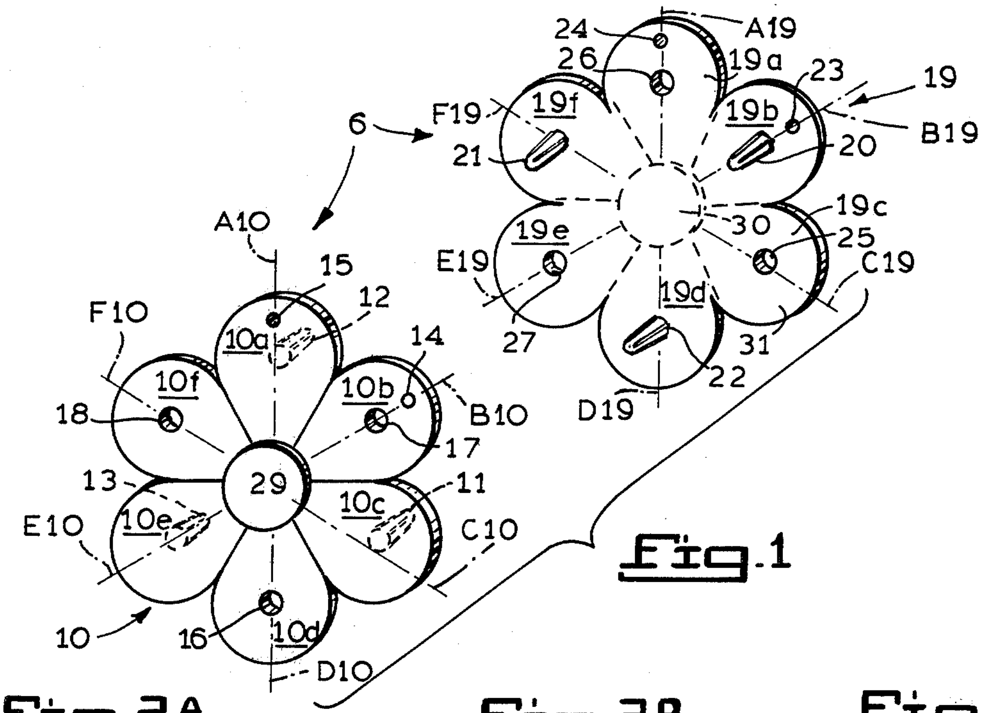
Fig. 1
Fig. 2A
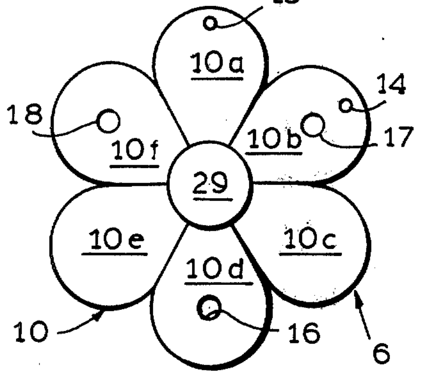
Fig. 2B
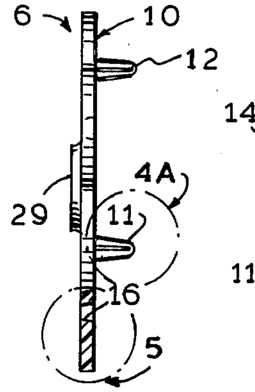
Fig. 2C
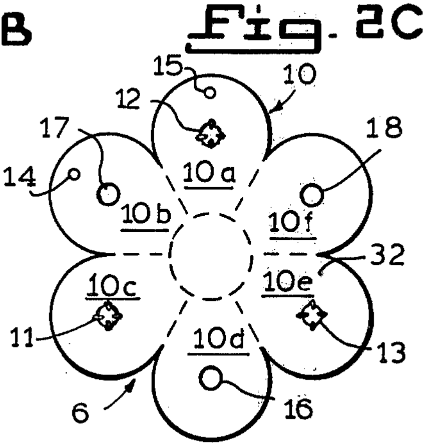
Fig. 3A
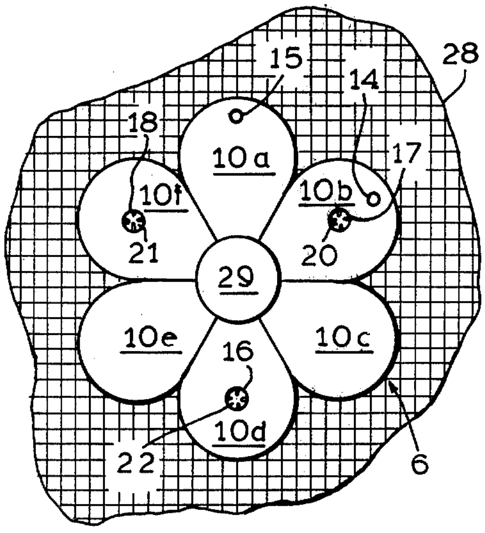
Fig. 3B
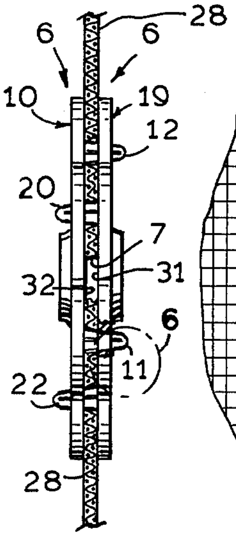
Fig. 3C
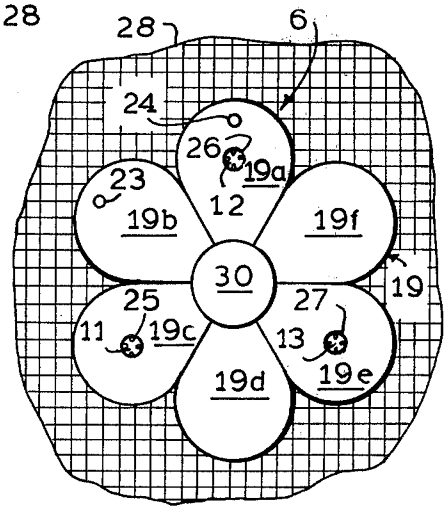

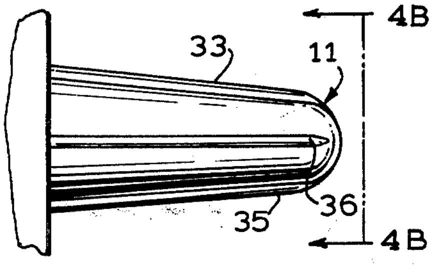
Fig 4A
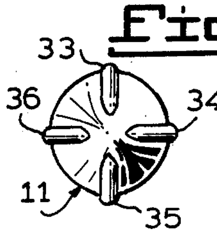
Fig 4B
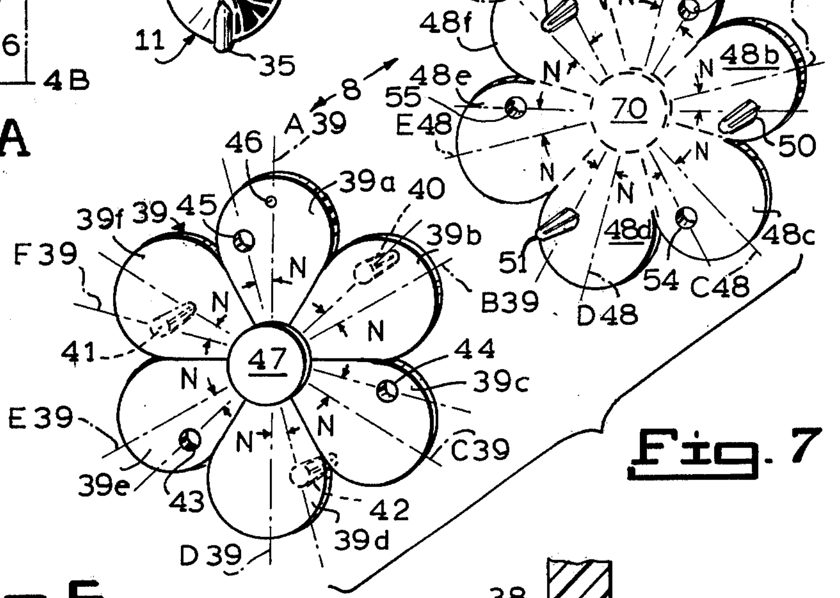
Fig. 7
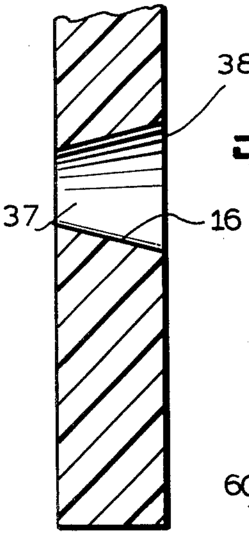
Fig 5
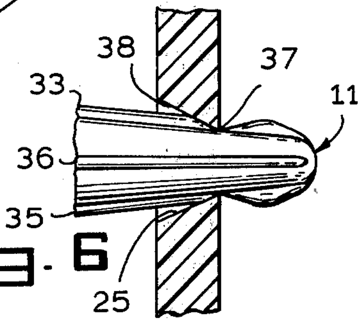
Fig. 6
Fig. 8
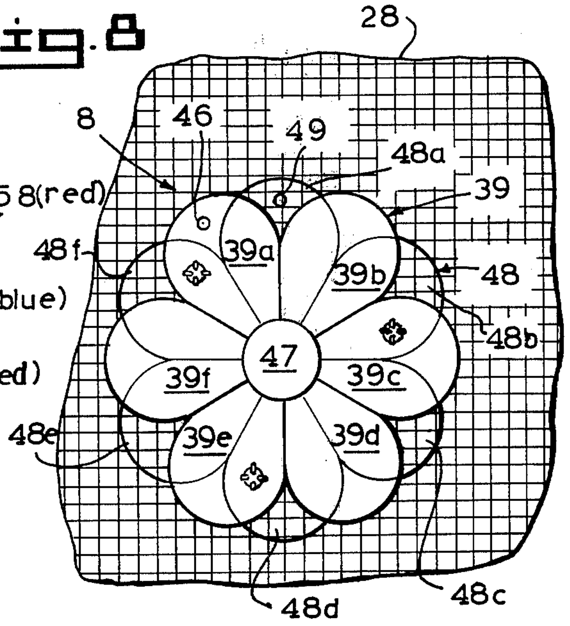
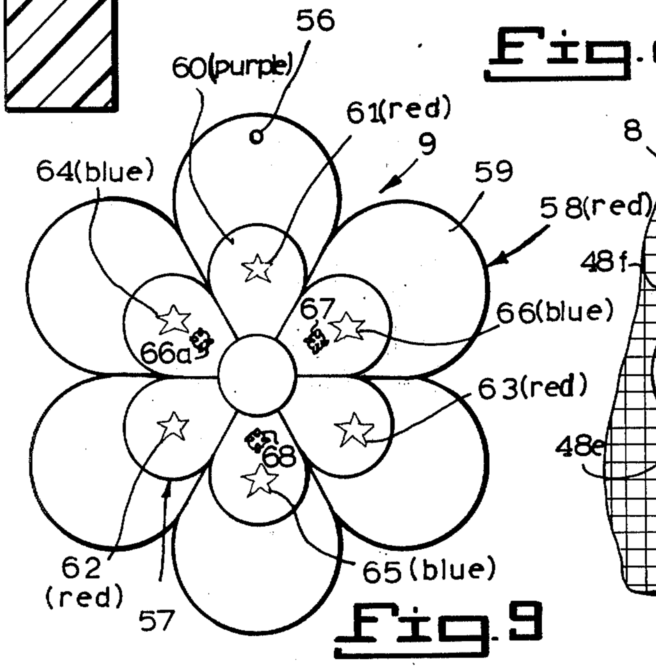
Fig 9

DECORATIVE PATCH

BACKGROUND OF THE INVENTION

Screens, such as those used in doors and windows to keep insects out of homes and the like, have been used for many years. It is well known that screens are very likely to be punctured or ruptured by some object that may inadvertantly come into contact with the screen. Such punctures or ruptures obviously greatly reduce the effectiveness of the screen in preventing insects from entering a dwelling. In addition, the cost and inconvenience of replacing such screens is not minimal. Furthermore, it is not efficient to replace an entire screen when only a portion of the screen has been damaged. Consequently, it is not surprising that in the past attempts have been made to provide some means of repairing a screen or the like that can increase its useful life.

Some of these devices for repairing window and door screens and the like are set forth in U.S. Pat. Nos. 1,324,845; 1,749,755; 1,792,594; 1,927,826; 2,272,196; 2,283,803; 2,397,646 and 2,487,830. A review of these patents indicates that they disclose various types of devices for repairing window and door screens and the like that utilize a woven-type material that is similar to the woven-type screen material that is to be repaired. This woven wire-type screen repairing material can be of the same gauge and mesh as that of the screen that is to be repaired or it may be of a different size. Certain of the patents disclose patches in which portions of the woven-type material itself is utilized in securing the woven patch to the screen that is to be repaired. This true, for instance, with U.S. Pat. Nos. 1,324,845; 1,792,594; 2,272,196 and 2,283,803. Some of the other patents disclose a screen patch or the like that has some type of border or fastening arrangement that is different from the wire mesh patch. The patents numbered U.S. Pat. Nos. 1,749,755 and 1,927,826, for instance, disclose this type of screen patch.

Other patents such as numbers U.S. Pat. No. 2,397,646 and 2,487,830 disclose wire mesh or mesh type patches that are affixed to the screen that is to be repaired either through the use of heat or by passing electric current through the screen that causes the patch to be affixed to the screen that is to be repaired. This type of screen patch, of course, requires a great deal more skill and effort to attach than the previously discussed screen patches that are disclosed in the aforementioned patents.

All of the patches disclosed in the previously mentioned patents suffer some serious disadvantages. First of all, it takes some degree of skill to properly apply these patches to the screen that is to be repaired. In addition, they leave a screen that has obviously been repaired and in most, if not all instances, is unattractive.

Through the use of this invention it is now possible to overcome these disadvantages associated with the prior art screen patches. This is possible since the current invention is quickly and easily attachable to the screen that is to be repaired without the need for any special skills or equipment. Moreover, the invention does not leave any unattractively repaired area since it actually decorates the screen and partially or totally obscures the area that has been repaired on the screen.

SUMMARY OF THE INVENTION

This invention relates to patches. More particularly to patches adapted to be connected to a thin material such as a screen or the like.

It is accordingly an object of the present invention to provide a patch that is capable of being readily and easily utilized to make repairs.

It is an object of the invention to provide a patch that can be utilized to make attractive repairs.

It is an object of the present invention to provide a patch that can conceal an area of material that is to be repaired.

It is an object of the present invention to provide a patch that can be readily attachable to and removable from the material that is to be repaired.

It is an object of the present invention to provide a patch that is suitable for use in making a temporary repair to a material.

It is a further object of the present invention to provide a patch that can be securely affixed to the material that is to be repaired.

It is a further object of the present invention to provide a patch that is capable of being utilized to achieve various decorative configurations.

It is also an object of the present invention to provide a patch that is capable of achieving various color arrangements.

It is also an object of the present invention to provide a patch that is capable of being utilized to achieve various degrees of translucency.

It is also an object of the present invention to provide a patch that is capable of being secured in a plurality of orientations.

It is also an object of the present invention to provide a patch that is capable of being utilized independently as a purely ornamental device.

It is also an object of the present invention to provide a patch that is capable of being assembled into a plurality of decorative color configurations.

It is also an object of the present invention to provide a patch that is capable of being attached to and repairing materials of varying thickness.

It is also an object of the present invention to provide a patch that makes it easy to determine when it has been correctly applied to the material that is to be repaired.

It is also an object of the present invention to provide a patch that is easy to manufacture and assemble.

The present invention provides apparatus for attachment to a thin material such as a window screen and the like that includes a first ornamental member and a second ornamental member. Each member has means that are insertable into the other ornamental member for connecting the one ornamental member to the other.

BRIEF DESCRIPTION OF THE DRAWINGS

The invention will hereinafter be more fully described with reference to the accompanying drawings in which:

FIG. 1 is a perspective view of the invention showing two major subassemblies in their disassembled positions;

FIG. 2A is a front elevational view of one of the subassemblies illustrated in FIG. 1;

FIG. 2B is a side elevational view, with a portion thereof broken away, of the structure illustrated in FIG. 2A;

FIG. 2C is a rear elevational view of the structure illustrated in FIGS. 2A and 2B;

FIG. 3A is a front elevational view of the structure illustrated in FIG. 1 with the two major sub-assemblies in their assembled position in use patching a hole in a thin material;

FIG. 3B is a side elevational view of the structure illustrated in FIG. 3A;

FIG. 3C is a rear elevational view of the structure illustrated in FIGS. 3A and 3B;

FIG. 4A is an enlarged view of a portion of the structure illustrated in FIG. 2B taken within the circle 4A thereof;

FIG. 4B is an end view of the structure illustrated in FIG. 4A taken in the direction of the line 4B—4B thereof;

FIG. 5 is an enlarged view of a portion of the structure illustrated in FIG. 2B taken within the circle 5 thereof;

FIG. 6 is an enlarged view of a portion of the structure illustrated in FIG. 3B taken within the circle 6 thereof;

FIG. 7 is a perspective view of an additional embodiment of the invention showing two major subassemblies in their disassembled positions;

FIG. 8 is a front elevational view of the structure illustrated in FIG. 7 illustrating the two major subassemblies in their assembled positions in use patching a hole in a thin material; and FIG. 9 is a front elevational view of a further embodiment of the invention showing two major subassemblies in their assembled positions.

DETAILED DESCRIPTION OF THE PREFERRED EMBODIMENTS

Referring first to FIG. 1 in the drawings, one embodiment of the decorative patch invention is illustrated and is designated generally by the number 6. The decorative patch 6 comprises two subassemblies or portions 10 and 19 illustrated disassembled and oriented as they would be prior to assembly and use. Although each of the two subassemblies 10 and 19 shown are substantially dimensionally the same, it is important to describe the orientation of subassembly 10 with respect to subassembly 19 in order to properly understand the desired mating and locking action of the subassemblies. Therefore, the individual components of each subassembly 10 and 19 are distinctly identified by specific numeric, etc., references in the drawings.

As illustrated in FIGS. 1, 2A, 2B and 2C, the front of one subassembly 10 has three connector pins designated by the numbers 11, 12 and 13 and retention holes 16, 17 and 18, that extend completely through the subassembly and are each located some distance from the center portion 29 of subassembly 10. Connector pin 13 is not visible in FIGS. 1, 2A, and 2B but is shown in FIG. 2C. The subassembly 19 also has three connector pins designated by the numbers 20, 21 and 22, and three retention holes 25, 26 and 27, each located some distance from the center portion 30 of subassembly 19. Subassembly 10 also has two holes designated by the numbers 14 and 15 located at the outer edge of the subassembly 10; and the subassembly 19 also has two holes 23 and 24 located at the outer edge portion of the subassembly 19.

The three connector pins 11, 12 and 13 which protrude from the back or flat side of the subassembly 10 are located in positions that permit them to be adapted to be aligned with the retention holes 25, 26 and 27 of the subassembly 19. Because of the relative positions of the connector pins and the retention holes, the three connector pins 20, 21 and 22, which protrude from the back or flat side of the subassembly 19 are necessarily aligned with the retention holes 16, 17 and 18 of the subassembly 10. Subassembly 10 can be joined to subassembly 19 by forcing the connector pins 11, 12 and 13 of the subassembly 10 into the retention holes 25, 26 and 27 of the subassembly 19 while at the same time forcing the connector pins 20, 21 and 22 of the subassembly 19 into the retention holes 16, 17 and 18 of the subassembly 10. In this case, the holes 14 and 15 of the subassembly 10 match up with holes 23 and 24 of the subassembly 19. The respective surface opposite the flat inside surfaces 31 and 32 of the subassemblies 19 and 10 have a three dimensional flower shaped design or surface configuration.

Only two suspension holes are illustrated in each subassembly 10 and 19 to reduce costs during manufacture and simplify matchup of holes 14 and 15 of subassembly 10 with holes 23 and 24 of subassembly 19. Utilizing the hole 15 of subassembly 10 and the hole 24 of subassembly 19 or the hole 14 of the subassembly 10 and the hole 23 of the subassembly 19, the invention 6 may be suspended for decorative purposes using wire, string, hanger, or some similar material. For example, the invention 6 can be suspended in a tree, window, mobile or similar location. Where it is not desired to suspend the invention, the holes 14 and 15 of the subassembly 10 may be deliberately mismatched with the holes 23 and 24 of the subassembly 19 to prevent any continuous hole through both subassemblies 10 and 19.

The subassembly 10 has symmetrical flower shaped petals designated 10*a*, 10*b*, 10*c*, 10*d*, 10*e* and 10*f* that radiate outward from the central circular portion 29. These petals 10*a* through 10*f* are substantially identical and they have central long axes respectively designated A10, B10, C10, D10, E10 and F10. The connector pins 11, 12 and 13 are located substantially on the respective axes C10, A10 and E10 of the respective petals 10*c*, 10*a* and 10*e*. Also the retention holes 16, 17 and 18 of the respective petals 10*d*, 10*b* and 10*f* are located substantially on the respective axes D10, B10 and F10. In a similar manner the holes 14 and 15 are located substantially on the axes B10 and A10 of the respective petals 10*b* and 10*a*.

The subassembly 19 also has petals 19*a*, 19*b*, 19*c*, 19*d*, 19*e* and 19*f* that radiate outward around the central circular portion 30. These petals 19*a* through 19*f* have respective long axes A19, B19, C19, D19, E19 and F19. The connector pins 20, 21 and 22 are located substantially along the respective axes B19, F19 and D19 of the respective petals 19*b*, 19*f* and 19*d*. In a similar manner the retention holes 25, 26 and 27 are located substantially along the respective axes C19, A19 and E19 of the respective petals 19*c*, 19*a* and 19*e*. The holes 23 and 24 are also located substantially along the respective axex B19 and A19 of the respective petals 19*b* and 19*a*. This location and orientation of the connector pins 11, 12 and 13; the corresponding retention holes 25, 26 and 27; the connector pins 20, 21 and 22; and the corresponding retention holes 17, 18 and 16 is necessary to insure the subassemblies 10 and 19 can be connected and that the outside configuration of the subassembly 10 substantially matches up with the outside configuration of the subassembly 19 when the two subassemblies or portions are joined together.

FIGS. 3A, 3B and 3C illustrate the decorative patch 6 in use patching a hole 7 in a thin penetrable material such as a screen 28 or the like. The mechanical alignment and connection technique previously described with respect to FIGS. 1, 2A, 2B and 2C is the same except that a material 28 is located between the substantially flat surface 31 of subassembly 19 and the substantially flat surface 32 of subassembly 10. In this case, the subassembly 10 is located on one side of the material with the connector pins 11, 12 and 13 pointed toward the material 28. When connecting the subassembly 10 through the material 28 to the subassembly 19, it is possible to use the assembly to decorate the material 28 or, in the case of damaged material 28, to repair the material 28. The material 28 may be screen, fabric, plastic or other similar material. However, for purposes of illustration, it is assumed that the material 28 is a ruptured window screen containing a hole 7 sufficiently large to allow insects to enter resulting in reduced efficiency for the screen.

In order to use the invention 6, the one subassembly 10 is placed over the opening or perforation 7 in the screen 28 to suitably cover the same, and the connector pins 11, 12 and 13 are forced through the normal interstices in the screen 28. Next, the other subassembly 19 is oriented in such a manner that the retention holes 25, 26 and 27 of subassembly 19 are aligned with the connector pins 11, 12 and 13 of subassembly 10. At the same time, the connector pins 20, 21 and 22 of the subassembly 19 are necessarily aligned with the retention holes 17, 18 and 16 of the subassembly 10. Of course, since the subassemblies 10 and 19 are substantially symetrical either or both of the assemblies can be rotated so that the connector pins of one subassembly can fit into different retention holes of the other subassembly and vice versa.

Following alignment, the subassemblies 10 and 19 are manually pressed together through the screen 28 and forced as close together as possible with the screen material 28 held in place between the inside substantially flat surface 31 of subassembly 19 and the inside substantially flat surface 32 of subassembly 10. This is usually accomplished by exerting a force on one subassembly in a direction toward the screen 28 with one hand and exerting an opposite force on the other subassembly 10 or 19 with the other hand. The same process can be employed for other types and varieties of materials, e.g. materials used for shower curtains, lampshades and plastic storm windows. In certain instances the pins such as the pins 11, 12 and 13 will actually pierce the material to be repaired.

The material 28 may be practically any thickness since the connector pins 11, 12 and 13 of the subassembly 10 extend through the retention holes 25, 26 and 27 of subassembly 19 and since the connector pins 20, 21 and 22 of the subassembly 19 extend through retention holes 17, 18 and 16 of the subassembly 10. With a relatively thin material 28 or where the invention is not used with a material, e.g. in the case of a suspended ornament, the connector pins will protrude further out from the surface of the opposite portion when in the assembled position. For a thicker material 28, the connector pins will not protrude as far out from the surface of the opposite portion when subassemblies 10 and 19 are in their assembled positions. From a practical standpoint, the invention can be economically manufactured to accommodate a wide variety of material types and thicknesses using the same basic design by merely altering the length of the pins 11, 12, 13, 20, 21 and 22.

An additional feature of this invention 6 is that the two subassemblies 10 and 19, which are easily connected together can also be separated. Provided proper care is taken during removal, the subassemblies 10 and 19 may be reused until mating connectors (which will be hereinafter described in greater detail) become excessively worn. The connected subassemblies or members 10 and 19 are normally taken apart manually by pulling them away from each other with the help of the fingers and fingernails on each hand. No adhesives, tools, or complicated installation/removal operations are involved.

Referring to FIGS. 4A and 4B, side and front views of a typical connector pin such as the pins 11, 12 and 13 of subassembly 10 and the pins 20, 21 and 22 of subassembly 19 are illustrated. However, only the connector pin 11 is illustrated since the other pins are identical. The connector pins 11, 12 and 13 of substantially 10 are tapered starting at some point from the surface 32 of subassembly 10 toward a point at the opposite end of the pin; this taper facilitates protrusion through various types of materials 28 and alignment with corresponding retention holes such as the holes 25, 26 and 27 of the other subassembly 19. Similarly, the connector pins 20, 21 and 22 of the subassembly 19 are tapered starting at some point from the surface 31 of the subassembly 19 toward a point at the opposite end of the pin. This taper facilitates the insertion and protrusion of the connector pins through various types of materials 28 and alignment with corresponding retention holes such as the holes 16, 17 and 18 of the subassembly 10. To improve interference lock-up of the pins with the corresponding holes, ribs designated by the numbers 33, 34, 35 and 36 in FIGS. 4A and 4B extent along the length of connector pins 11, 12 and 13 of the subassembly 10 and connector pins 20, 21 and 22 of the subassembly 19 at substantially equally spaced intervals as viewed in FIG. 4B from the front toward the pointed portion of the pin.

FIG. 5 illustrates a sectional side view of a typical retention hole such as the retention holes 16, 17 and 18 of the subassembly 10 and 25, 26 and 27 of the subassembly 19 is illustrated. However, only the specific retention hole 16 is illustrated in FIG. 5 since the other holes are substantially identical. The retention hole 16 is tapered with the larger opening 38 being located near the point of entry for the corresponding pin of the other member and the smaller opening 37 being located near the point of exit for the connector pin such as the pins 11, 12 and 13 of subassembly 10 and connector pins 20, 21 and 22 of subassembly 19 when the appropriate connector pins are inserted into retention holes such as 16, 17 and 18 of subassembly 10 and retention holes such as 25, 26 and 27 of subassembly 19.

As the connector pins, such as the pins 11, 12 and 13 of subassembly 10 and the pins 20, 21 and 22 of subassembly 19 are inserted in openings 38 and forced through the retention holes such as 16, 17 and 18 of subassembly 10 and 25, 26 and 27 of subassembly 19, the ribs 33, 34, 35 and 36 are compressed as they are forced through the exit area 37 as illustrated in FIG. 6. The connector pins such as the pins 11, 12 and 13 of subassembly 10 and 20, 21 and 22 of subassembly 19 and their ribs 33, 34, 35 and 36 are sufficiently oversized with respect to the retention holes such as the holes 16, 17 and 18 of subassembly 10 and 25, 26 and 27 of subassembly 19 to achieve an interference or frictional fit and lock-up of the subassembly 10 with the subassembly 19.

It will be appreciated that various modifications can be made to the previously described embodiment 6 of the invention. For example, the quantity and location of connector pins such as the pins 11, 12 and 13 of subassembly 10 and 20, 21 and 22 of subassembly 19 and retention holes such as the holes 16, 17 and 18 of subassembly 10 and 25, 26 and 27 of subassembly 19 can be varied to achieve special effects. Also, as illustrated in FIGS. 1 through 3C, a flower pattern is used for purposes of describing this invention. In practice, the pattern used could by a mushroom, butterfly or similar design or symmetric or partially symmetric configuration. Also, as will hereinafter be described in connection with other embodiments of this invention, variations in color and pattern orientation can be utilized to increase the functional and decorative value of this invention.

Referring to FIG. 7, another embodiment of this invention is illustrated that is substantially the same as the previously described embodiment but which utilizes a different geometric variation of the previously described invention illustrated in FIGS. 1 through 6. The invention illustrated in FIG. 7 is designated generally by the number 8 and comprises two subassemblies or portions 39 and 48. The physical difference in the new embodiment 8 is that connector pins 40, 41 and 42 of the subassembly 39 and retention holes 43, 44 and 45 of subassembly 39 are all offset substantially a given number of degrees N from the centerline or central long axes A39, B39, C39, D39, E39 and F39 of the respective petals *39a*, *39b*, *39c*, *39d*, *39e* and *39f* that radiate outward from the circular center portion 47.

Also the connector pins 50, 51 and 52 of the subassembly 48 and retention holes 53, 54 and 55 of the subassembly 48 are similary offset the same number of degrees N from the centerlines or central long axes A48, B48, C48, D48, E48 and F48 of the respective petals *48a*, *48b*, *48c*, *48d*, *48e* and *48f* that radiate outward from the circular center portion 70. When the connector pins 40, 41 and 42 of subassembly 39 are aligned with retention holes 53, 55 and 54 of subassembly 48 and connector pins 50, 51 and 52 of subassembly 48 are aligned with retention holes 44, 43, and 45 of subassembly 39 and the assemblies 39 and 48 connected then the patterns or exterior outer edges of subassembly 39 and subassembly 48 are deliberately mismatched to compliment each other.

The effect of joining together subassembly 39 with subassembly 48 is illustrated in FIG. 8. The portions 39 and 48 each are made from a translucent or transparent material which may be of the same or different colors. As illustrated, the outline of subassembly 48 is visible through subassembly 39 giving the assembly 8 an unusual appearance. Additionally, by using one color material for subassembly 39, and a different color material for subassembly 48, an additional color in the overlay areas which is a combination of the subassembly 39 and 48 colors can be obtained. This technique provides a method for achieving multicolor variations in an inexpensive manner.

As shown in FIG. 8, the pattern of the subassembly 39 is not aligned with and does not match directly with the pattern of the subassembly 48. Therefore, the hanging hole 46 of the subassembly 39 and the hanging hole 49 of the subassembly need not be aligned to hand the invention as an ornament since they are always exposed. When the invention is used to decorate or patch a material 28, the same principle is utilized in mating the subassembly 39 with the subassembly 48 as was described in connection with the mating subassembly 10 with the subassembly 19 of the embodiment 6. As illustrated in FIG. 8, it may also be observed that the offset arrangement increases the total effective area of the invention, which is especially desirable when the invention is used to patch materials with large holes.

Referring to FIG. 9, a front view of another embodiment of the invention is illustrated and designated by the number 9. The decorative patch 9 comprises one subassembly 57 which is adapted to be connected to a larger subassembly 58. The connection technique is essentially the same as that employed for the standard configuration as previously described in connection with the decorative patch 6. In this case, the hanging hole 56 is located on the subassembly 58 and the subassembly 57 does not have a hanging pole. The portions 57 and 58 are made from different colored translucent materials. When the subassembly 57 of one color is connected to the larger subassembly 58 of a different color, it is possible to achieve multicolored decorative patterns when light passes through the assembly 9. This effect could be achieved using opaque colors but is more effective with transparent or translucent materials since an additional color can be achieved. For this description, translucent materials will be assumed.

By deliberately eliminating material from the subassembly 57 and the subassembly 58, in a pattern form, additional decorative effects are achieved when the portions or subassemblies 57 and 58 are connected. For example, as illustrated in FIG. 9, the subassembly or portion 57 will be assumed to be translucent blue and the subassembly or portion 58 will be assumed to be translucent red. Subassembly 57 has substantially identical ornamentative cutout aperatures 61, 62 and 63 that extend completely through the subassembly 57. Subassembly 58 also has substantially identical ornamentative apertures 64, 65 and 66 that extend completely through the subassembly 58. When the subassembly 57 is connected to the subassembly 58, multicolored pattern effects are achieved. For example, the outer portion of each flower petal of subassembly 58 which is designated by the number 59 appears red. The area of subassembly 57 designated by the number 60 appears purple which is a new color. Cutout holes 61, 62 and 63 appear red and cutout holes 64, 65 and 66 appear blue. In effect, it is possible to achieve a wide variety of multicolored pattern variations inexpensively using the basic concept of the invention 9. The connector pins *66a*, 67 and 68 themselves will provide additional color contrast.

It should be noted that the connector pins and the retention holes of the embodiments illustrated in FIGS. 7, 8 and 9 are identical and function in the same manner as those illustrated in FIGS. 4A, 4B, 5 and 6. It will also be apparent that the connector pins and the retention holes of the embodiment illustrated in FIG. 9 are located substantially along the long central axes of the petals in the manner illustrated and described with respect to the embodiment illustrated in FIG. 1.

The variations of patterns, colors, cutouts, sizes and combinations of these which can be achieved in this invention provide both functional and decorative value. The invention is quick and easy to assemble and install, can provide design and colors that are attractive and serve to hide or conceal the opening that is repaired.

Although the invention has been described with reference to certain preferred embodiments, it should be understood that many variations and modifications may be made without departing from the spirit and scope of the invention as defined in the appended claims.

What is claimed is:

1. A patch for attachment to a thin material for repairing and decorating thin materials comprising a first ornamental or decorative member and a second ornamental or decorative member; said first ornamental or decorative member having a substantially flat surface adapted to contact one side of said thin material, said second ornamental or decorative member having a substantially flat surface adapted to contact the opposite side of said thin material, said first and said second ornamental or decorative members each having a plurality of spaced projections projecting from the substantially flat surface of said ornamental or decorative member, said plurality of spaced projections being adapted to pierce said thin material, said first and said second ornamental or decorative members each having a plurality of spaced apertures spaced to receive the plurality of spaced projections of the other ornamental or decorative member, each of said apertures extending completely through said ornamental or decorative members and being tapered with the larger opening thereof being located near the point of entry for the corresponding projection of the other ornamental or decorative member and the smaller opening thereof being located near the point of exit for said projection, the spaced apertures and spaced projections of each of said first and second ornamental or decorative members being located to permit said first and said second ornamental or decorative members to be oriented with respect to each other in order that the projections fit into different apertures, each of said projections having a plurality of substantially equally spaced raised portions extending from the outer surface thereof, said raised portions being compressible as said projections are forced into said apertures and being sufficiently oversized with respect to said apertures to achieve an interference fit.

2. The patch of claim 1 wherein said ornamental or decorative members are substantially identical.

3. The patch of claim 1 wherein said ornamental or decorative members comprise a material that permits at least partial transmission of light.

4. The patch of claim 3 wherein said ornmental or decorative members are of a different color.

5. The patch of claim 4 wherein ornamental or decorative members have different configurations.

6. The patch of claim 5 wherein at least one of said ornamental or decorative members has a plurality of ornamentative apertures extending therethrough.

* * * * *